July 22, 1969  M. S. LIPSETT ET AL  3,457,415

PASSIVE OPTICAL RESONATORS AND SYSTEMS EMPLOYING THE SAME

Filed Oct. 4, 1965  6 Sheets-Sheet 1

INVENTORS.
Morley S. Lipsett
Paul H. Lee

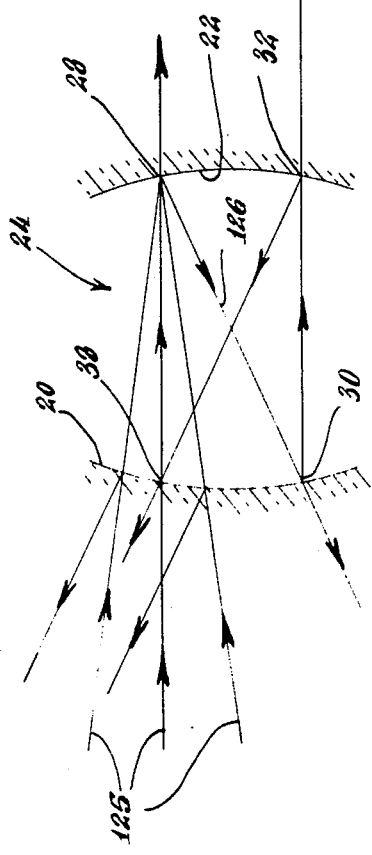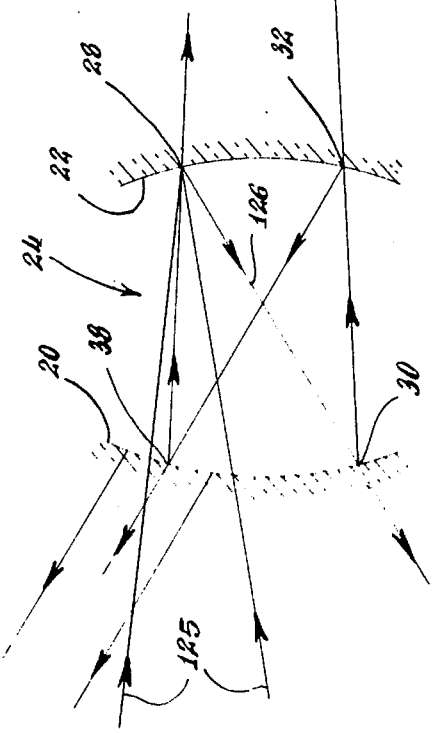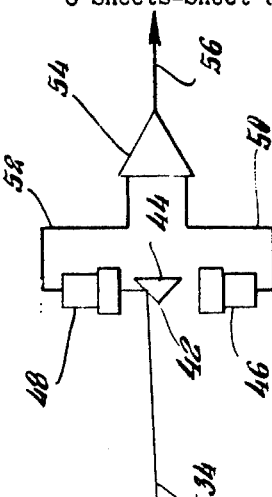

July 22, 1969     M. S. LIPSETT ET AL     3,457,415
PASSIVE OPTICAL RESONATORS AND SYSTEMS EMPLOYING THE SAME
Filed Oct. 4, 1965     6 Sheets-Sheet 4

INVENTORS.
Morley S. Lipsett
Paul H. Lee

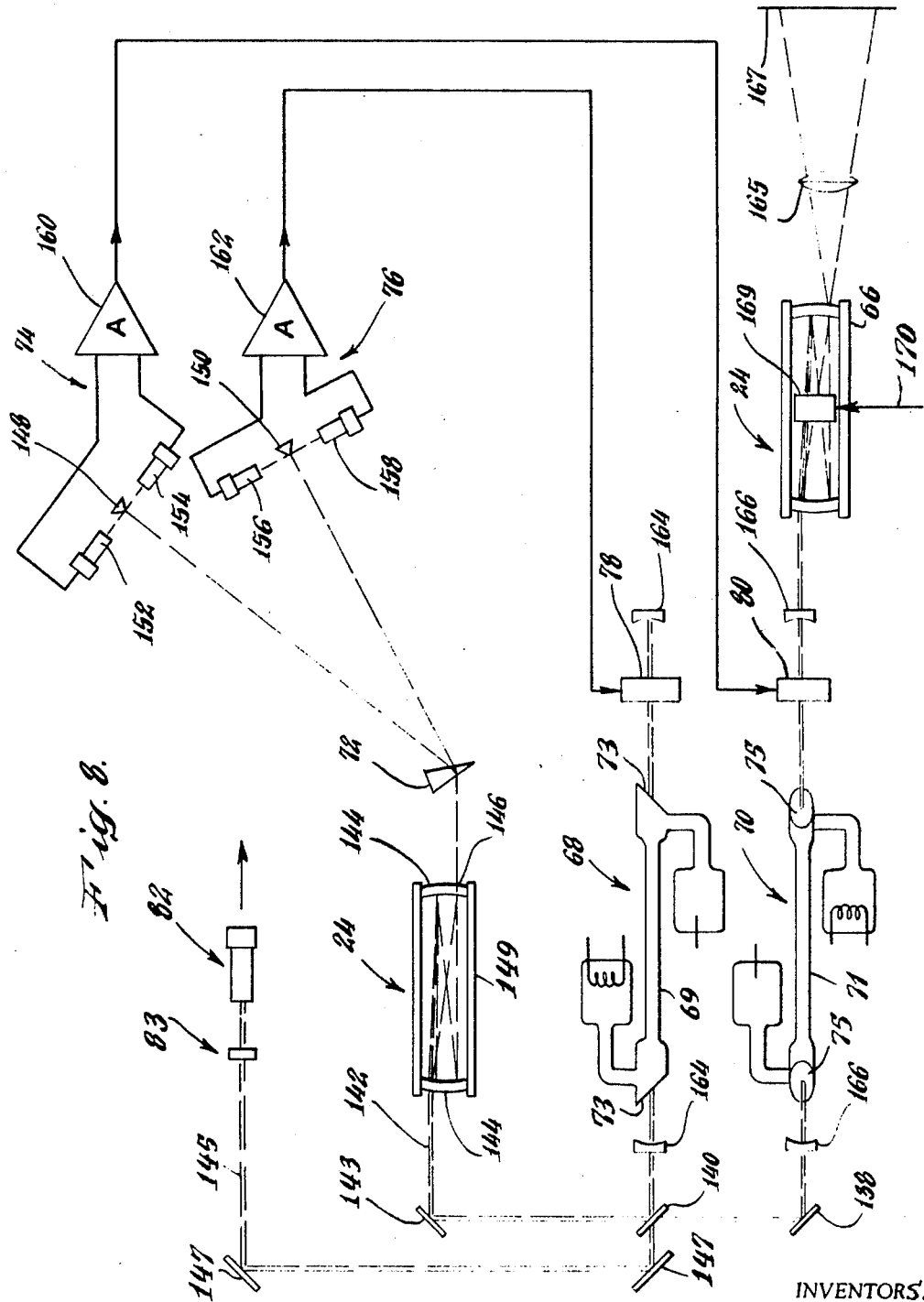

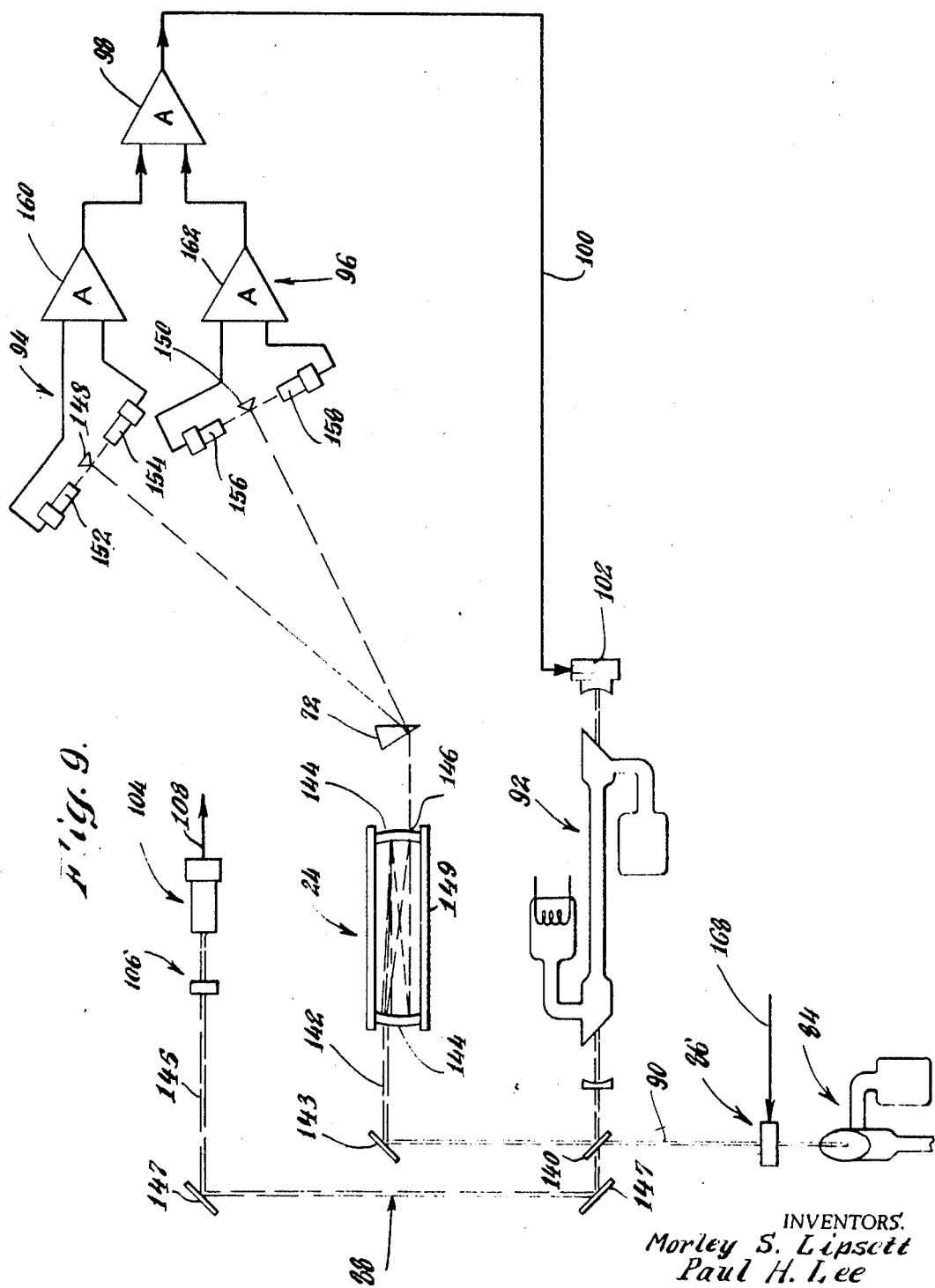

United States Patent Office 3,457,415
Patented July 22, 1969

3,457,415
PASSIVE OPTICAL RESONATORS AND SYSTEMS EMPLOYING THE SAME
Morley S. Lipsett, South Norwalk, and Paul H. Lee, Westport, Conn., assignors to The Perkin-Elmer Corporation, Norwalk, Conn., a corporation of New York
Filed Oct. 4, 1965, Ser. No. 492,474
Int. Cl. H04b 9/00
U.S. Cl. 250—199                     24 Claims

ABSTRACT OF THE DISCLOSURE

An over-illuminated dispersive optical system that may be used as a discriminator or multiport optical circulator. The system comprises a resonator having a pair of identical curved mirrors spaced apart a distance slightly less than their radius of curvature. It is illuminated off-axis by a beam of light of greater cross section than the mode pattern formed—the mode pattern consisting of spots on one mirror and lines on the other.

---

This invention relates to passive optical resonators and to systems employing the same. More particularly, it relates to a resonant optical circulator employing two spherical mirrors illuminated off-axis. The resonator is a dispersive optical device which may be employed in known optical systems wherein prisms diffraction gratings and Fabry-Perot etalons have hithertofore been employed.

The invention provides an optical discriminator employing the resonator of the invention for the detection of changes in frequency or wavelength of light passing therethrough. Because the resonator of the invention acts as an optical circulator, it does not reflect any light entering it back to the light source illuminating it. The discriminator of the invention may thus be used to analyze and control the light output of an optical oscillator, i.e., a laser. Furthermore, the optical discriminator of the invention makes possible a simple heterodyne optical communications receiver. Because the resonator of the invention is a passive device, it may be located in a controlled environment to establish a standard of frequency or wavelength.

The invention of the laser gave rise to the expectation that a new standard of wavelength and frequency was at hand and to the further hope that optical communications systems of enormous bandwidth might be devised. However, although researchers all over the world have been diligently seeking practical ways of bringing these promises to fruition, many problems have up until now prevented their fulfillment. It was soon discovered that the output of a laser is ordinarily not one frequency, but many frequencies comprising various spatial modes or resonances within the laser. These modes are analogous to the modes of oscillation of microwave cavities and organ pipes. Even within the modes themselves, the frequency of a laser is not defined with great precision due to the thermal motion of the atoms giving rise to the stimulated emission from the laser. Thus, even though researchers through fairly complicated means and high precision optical devices have been able to suppress oscillations of some lasers e.g. gas lasers, to a single mode, the frequency of operation is still indeterminate within the so-called dopler line width. For a gas laser this is approximately 1500 megacycles per second. Thus, the hoped for frequency standard has not been achieved.

The use of a laser as a laboratory standard of a wavelength and hence distance was immediately apparent. However, until now the only practical way in which a laser can thus be used is to stabilize it within the dopler line width defined above to provide a constant frequency source. However, atmospheric pressure, temperature, and humidity changes cause the index refraction of air to change radically enough to greatly affect the wavelength of the light emitted from such a laser even though the frequency is constant. Thus, in order to use the laser as a laboratory standard of wavelength, it is necessary to compute changes in wavelength due to barometric pressure, temperature, and humidity changes in the environmental atmosphere. One company has marketed such an instrument employing a special purpose computer to automatically take these effects into account. However, this instrument is prohibitively expensive for most laboratories.

While investigating a pair of spherical mirrors of identical radius spaced apart approximately by their radius in a so-called confocal configuration, we first observed the multiple mode patterns that may arise therein when this resonator is illuminated off-axis as disclosed in an article entitled Off-Axis Paths in Spherical Mirror Interferometers by D. Herriott, H. Kogelnik, and R. Kompfner appearing at page 523 in vol. 3, No. 4, Applied Optics for April 1964. These mode patterns arise because the path of the light within the resonator forms a closed circuit equal in length to an integral number of wavelengths of the monochromatic light supplied to the resonator. Standing waves are set up in the resonator somewhat analogous to those in a very long organ pipe or a microwave cavity when excited by an overtone frequency of its fundamental resonant frequency. In order to observe the mode patterns seen by Herriott, et al., it is necessary to illuminate the light spots formed at the ends of the cavity over the area of one of these spots. We call this normal resonator illumination. If the frequency of the light source then changes the light path in the resonator will no longer be an integral number of wavelengths. Due to interference effects, the mode pattern will then be extinguished and the spots of light seen at the reflecting surfaces of the resonator will disappear.

We discovered that if one illuminates such a mode pattern with a light beam covering an area greater than a spot of light formed at the end walls of the cavity during resonance and if the frequency of the light source then changes slightly, the mode pattern will not be extinguished but will shift and the spot of light of the mode pattern will shift within the area of the illuminating beam. Secondly, we observed that when a nearly confocal resonant system is illuminated off-axis, that is, by a light beam tracing a ray path within the resonator which is never normal to a surface in the resonator, no light will be reflected back to the light source. Thus such a system may be utilized to observe changes in frequency of a light source or for frequency control of a laser without affecting the laser in any way. In other words, in electrical engineering terms the resonant cavity is decoupled from the laser.

It is, therefore, an object of the invention to provide a passive optical resonator.

Another object of the invention is to provide a dispersive optical system.

Still another object of the invention is to provide an optical discriminator.

A further object of the invention is to provide an optical discriminator providing an electrical output signal.

Another object of the invention is to provide a laser stabilization system.

Still another object of the invention is to provide a laser stabilization system that stabilizes the frequency of operation of a laser.

Yet another object of the invention is to provide a laser stabilization system that stabilizes the wavelength of the light emerging from a laser.

A further object of the invention is to provide an extremely stable frequency and wavelength source.

Another object of the invention is to provide a system for examining the stabilities both absolute and relative of a pair of lasers.

A further object of the invention is to provide an optical heterodyne receiver.

Another object of the invention is to provide an optical beam deflector.

A still further object of the invention is to provide an optical circulator.

A yet further object of the invention is to provide a resonant optical circulator.

Other objects of the invention will in part be obvious and will in part appear hereinafter. The invention accordingly comprises the features of construction, combinations of elements, and arrangements of parts which will be exemplified in the constructions hereinafter set forth, and the features of operations, combinations of functions and sequences of operations and signals which will be exemplified in the systems hereinafter set forth, and the scope of the invention will be indicated in the claims.

For a fuller understanding of the nature and objects of the invention, reference should be had to the following detailed description taken in connection with the accompanying drawings in which:

FIGURE 4 is a diagram partially in schematic form of the optical discriminator as shown in FIGURE 2;

FIGURE 5 is a diagram partially in schematic form of the optical discriminator as shown in FIGURE 3;

Figure 10:
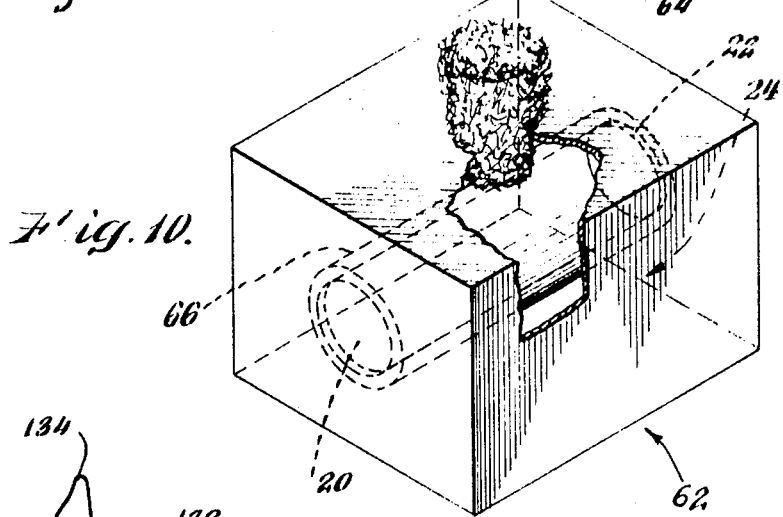

FIGURE 8 is a diagram partially in schematic form of a system for observing the frequency stability of a pair of lasers according to the invention and FIGURE 9 is a diagram partially in schematic form of a laser communications system employing heterodyne or superheterodyne modulation detection according to the invention; and FIGURE 10 is a perspective view partially cut away of an optical resonator system according to the invention for establishing an environmental wavelength standard.

The same reference numerals refer to the same parts throughout the several views of the drawings.

Figure 1:
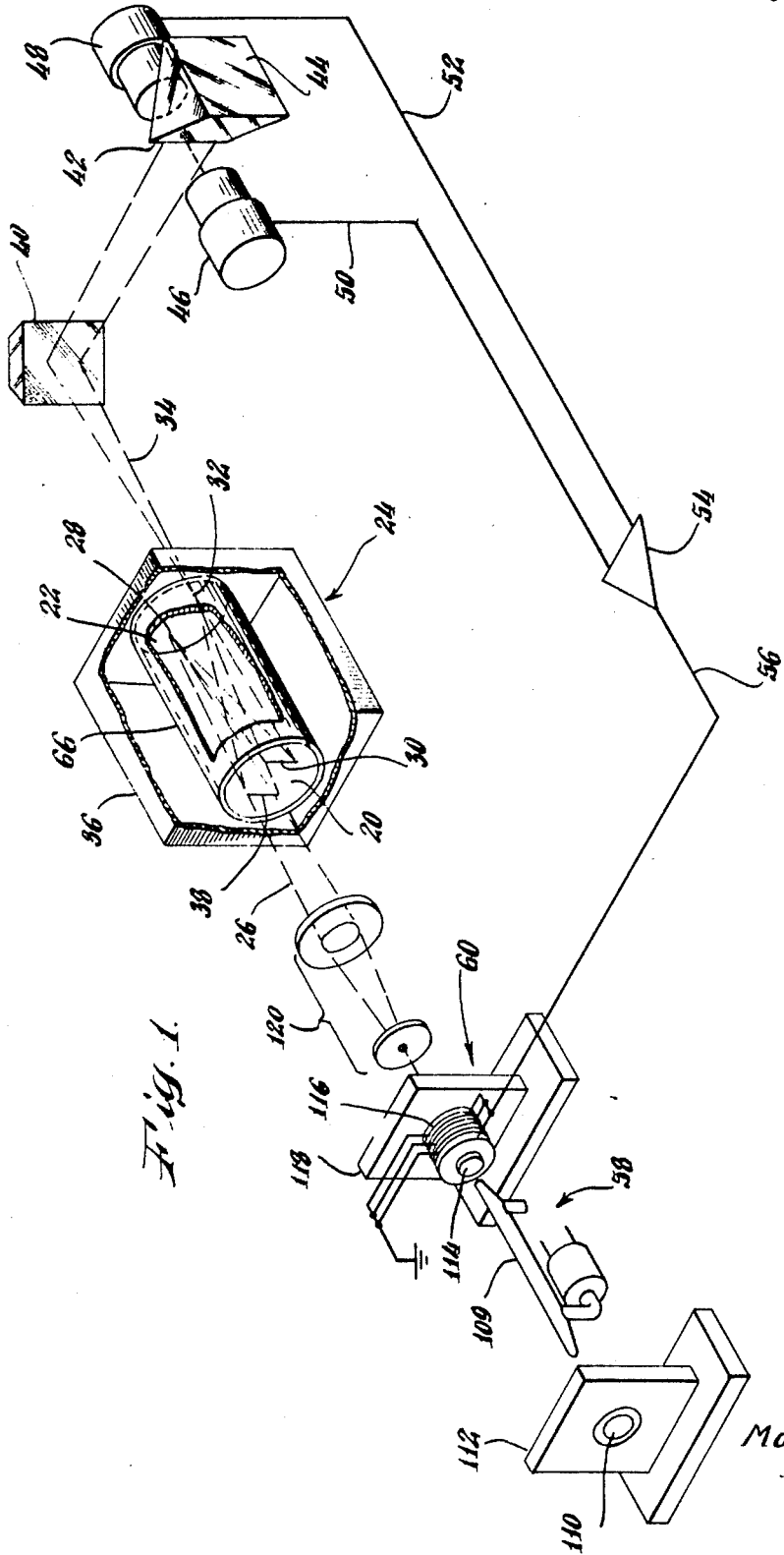
FIGURE 1 is a perspective view partially in diagrammatic form of a laser frequency stabilization system and a beam deflector according to the invention.

Referring now to FIGURE 1 of the drawings, the optical resonator 24 of the present invention generally comprises a pair of multi-layer dielectric coated spherical mirrors 20 and 22 separated by a distance slightly less than their radius of curvature. An off-axis mode pattern of the resonator 24 is excited by focusing a beam 26 of nearly monochromatic light to an off-axis point 28 on mirror 22. The light is reflected back to mirror 20 and the system is resonant along a line 30 on the mirror 20. The beam is reflected along line 30 and is again focused at point 32 on mirror 22. A portion of the light passes therethrough forming a divergent exit beam 34. The major portion of the light is reflected back to line 38 on mirror 20 and is again reflected by mirror 20 to point 28 on mirror 22 to begin another circuit around the resonator 24. The mirrors 20 and 22 are preferably mounted in an invar cylinder 66 and the resonator 24 is preferably located within an environmental control box 36.

The mode structure of the resonator 24 is described herein as over-illuminated. The mode pattern of the resonator 24 as may be viewed through the mirrors 20 and 22 comprises spots at points 28 and 32 and lines 30 and 38. According to the prior art article of Herriott et al. cited above, the beam 26 should be restricted to illuminate only the line 38. When this is done, the phenomenon on which the present invention relies does not occur. The resonator 24 when over-illuminated as shown in FIGURE 1, forms a dispersive optical system because as the frequency or wavelength of the light in light beam 26 changes slightly, the resonant condition of the resonator 24 can be maintained by outward or inward displacement of the lines 30 and 38. Thus, if the wavelength increases the lines move away from the central axis of the resonator 24. If the wavelength decreases, they move inward toward the central axis.

The over-illuminated resonator 24 may be used as an optical discriminator because as the line 30 moves with respect to the fixed point 32, the output beam 34 will also move angularly. One merely needs to derive a signal proportional to this angular movement to provide an optical discriminator. As shown in FIGURE 1, beam 34 is reflected at flat mirror 40 (forming no part of the invention) and impinges upon the peak 42 of a prism 44. Half of beam 34 is reflected to the left and the other half to the right by the faces of prism 44. The left hand beam falls on a photodetector 46 and the right hand beam falls on photodetector 48. Thus, if the beam of light 26 falling on the resonator 24 is of a predetermined frequency, the signals supplied by the photodetectors 46 and 48 on their output lines 50 and 52 will be the same. If the frequency increases, that is the wavelength decreases, photodetector 46 will receive more light than photodetector 48 and vice versa. These changes are detected in the differential amplifier 52 and the signal supplied thereby on line 56 is proportional to the change in frequency of the beam 26.

This signal may be used to control the frequency of the light source supplying the beam 26 by tuning means generally indicated at 58. If the light source as shown in FIGURE 1 is a laser as generally indicated at 58, there is provided a laser frequency control system according to the invention.

If one wishes to have an environmental wavelength standard which is unaffected by changes in the environmental atmosphere one uses an environmental control box as indicated at 62 in FIGURE 10 which opens the resonator 24 to the atmosphere through a cotton plug 64. Cotton plug 64 allows long terms variations in atmospheric pressure, temperature, and humidity to affect the resonant wavelength of the resonator 24 but prevents short term variations such as soundwaves from affecting the wavelength standard.

A portion of the apparatus of FIGURE 1 operates as an optical beam deflector. A potential applied to line 56 will change the frequency output of laser 58. This will cause a corresponding deflection of beam 34.

Referring to FIGURE 8, the relative and absolute stabilities of a pair of lasers 68 and 70 may be observed by over-illuminating a resonator 24 according to the invention with orthogonally polarized light from the two lasers, separating the two orthogonally polarized beams by a beam splitter 72, detecting changes in frequency of the lasers by means of discriminator detectors 74 and 76, and tuning each of the lasers by tuning means 78 and 80. This system stabilizes the lasers 68 and 70 within the bandwidth of the servoloop, basically the bandwidth of the amplifiers 160–162 in the discriminators 74 and 76. Changes in frequency between the two lasers 68 and 70 occurring at frequencies above the bandwidth of the servoloops may be detected by photodetector 82 on which the two beams are allowed to fall after being brought to the same polarization by means generally indicated at 83. By choosing the bandwidth of at least one of the servoloops to be below the audio range, the system of FIGURE 8, becomes a sensitive microphone.

In addition, the system may be used as an optical beam deflector. This beam deflector comprises the frequency stabilized laser 70, a resonator 24 according to the invention, a lens 165, a screen 167, and electro-optical light path varying means 169. A signal supplied on line 170 to means 169 changes the resonant frequency of the resonator 24 and deflects the frequency stable beam supplied thereto. This is focused by lens 165 on screen 167.

A heterodyne optical communications receiver according to the invention is illustrated in FIGURE 9. Light from a distant laser 84 which may be frequency controlled in the manner illustrated in FIGURE 1 is modulated by modulator 86. After travelling the desired distance, it arrives at the heterodyne receiver generally indicated at 88. The light beam 90 from the distant transmiter overilluminates the resonator 24 according to the invention as does the light beam from a local oscillator laser 92. The frequency drifts of one of the lasers is detected by discriminator detector 94 and of those the other laser by discriminator detector 96. The two error signals therefrom are supplied to a differential amplifier 98 producing a signal equal to the algebraic difference therebetween. This signal is supplied by line 100 to tuning means 102 for tuning laser 92.

When the differential amplifier 98 is adjusted to provide a signal equal to the absolute difference between the signals from the discriminator detectors 94 and 96, local oscillator laser 92 is tuned by tuning means 102 to the same frequency as the distant laser 84. The modulation of the beam 90 may be detected by allowing light from the two lasers to fall on a photodetector 104 after passing through common polarization means 106 which brings the two beams to a common polarization. The signal on line 108 from photodetector 104 is then the same as the modulation signal supplied to the modulator 86.

The system illustrated in FIGURE 9 may be used as a super-heterodyne receiver by adjusting differential amplifier 98 to produce a signal on line 100 equal to the difference in the signal supplied thereto plus a constant. The magnitude of this constant will determine the difference in frequency between the distant laser 84 and the local laser 92 which will be kept constant by the servosystem. In this case, the signal on line 108 from the photodetector 104 will be the modulation signal supplied to modulator 86 shifted to about a new intermediate frequency which may be chosen for ease of amplification prior to ultimate modulation detection by common radio demodulation means.

More particularly referring to FIGURE 1, laser 58 comprises a direct current excited plasma tube 109 containing a gaseous mixture capable of laser action such as the well-known mixture of helium and neon. A first laser resonator mirror 110 is mounted to a rigid support 112; a second laser resonator mirror 114 is mounted to a pile of piezoelectric discs 116 which are in turn mounted to rigid support 118. The piezoelectric discs 116 are excited through electrical means connected to ground and to line 56 such that a signal on line 56 will cause the mirror 114 to move along the axis of plasma tube 109 to thus vary the operating frequency of the laser 58. Thus, the laser 58 is tuned by a signal on line 56. The light from laser 58 is supplied to appropriate optics 120 forming a convergent beam 26 focused at point 28 on mirror 22. The axis of beam 22 is parallel to but displaced from the central axis of the resonator 24.

Figure 2:
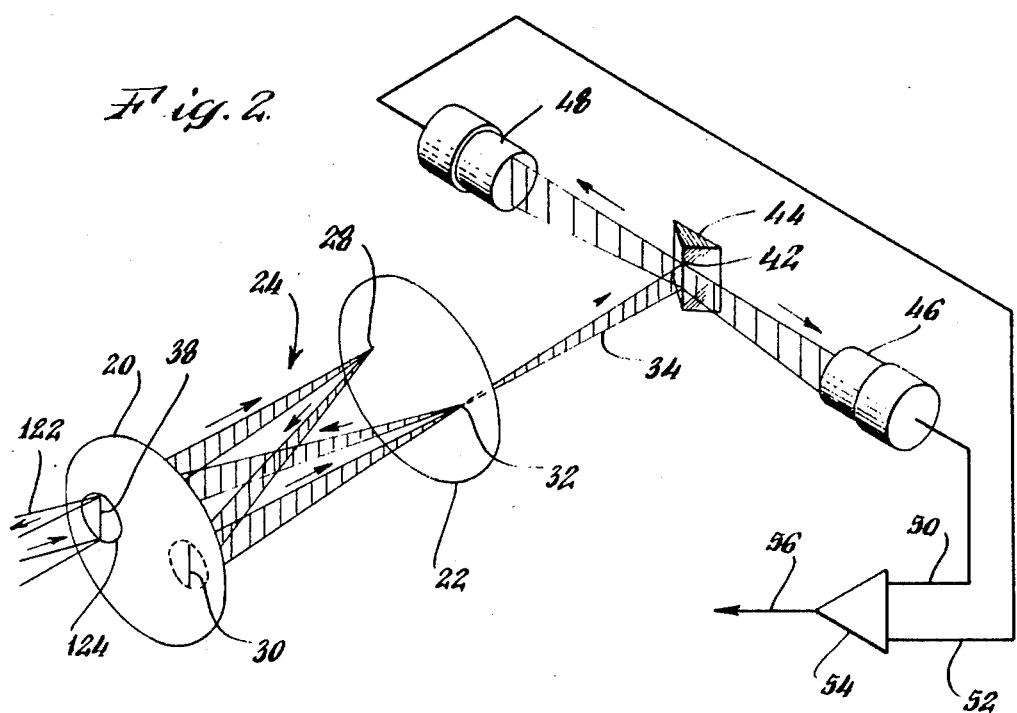
FIGURE 2 is a diagrammatic view partially in schematic form of an optical discriminator providing an electrical signal output according to the present invention.

Now referring to FIGURE 2, that portion 122 of the beam 26 which is resonant in the resonator 24 forms a line 38 on mirror surface 20 and a corresponding line 30 on the other side of the central axis of the resonator 24. The lines 38 and 30 and the spots at points 28 and 32 on mirror 22 are the mode pattern of the resonator 24.

This pattern is over-illuminated because beam 26 illuminates spot 124 on mirror 20 which is larger than the resonant line 38. If the frequency of the light in the beam 26 changes slightly, the resonant portion 122 of beam 26 will move slightly to the left or right such that the total ray path in the resonator 24 will remain an integral number of wavelengths. Thus, any wavelength or frequency change in the beam illuminating the resonator 24 will produce a spatial shift in the mode pattern within the resonator 24 and in the mode pattern observed on the mirror 20. In the same way the light emerging from the resonator at points 28 and 32 and along lines 30 and 38 will exhibit spatial changes. For convenience, we use the light exiting from point 32 which with changes in frequency or wavelength of the light falling on the resonator 24 will exhibit angular changes, rotating about point 32. As previously stated this beam 34 is allowed to fall on prism 44 which acts as a beam divider allowing one-half of the beam to fall on photodetector 46 and the other half to fall on photodetector 48 at the chosen operating frequency or wavelength of the laser 58 (FIGURE 1).

Photodetectors 46 and 48 may be type 9592B photomultiplier tubes manufactured by Electrical and Musical Industries, Ltd. The signals from photomultiplier 46 and 48 are supplied by lines 50 and 52 to differential amplifier 54 (which may be type D manufactured by Techtronics, Inc.).

Figure 3:
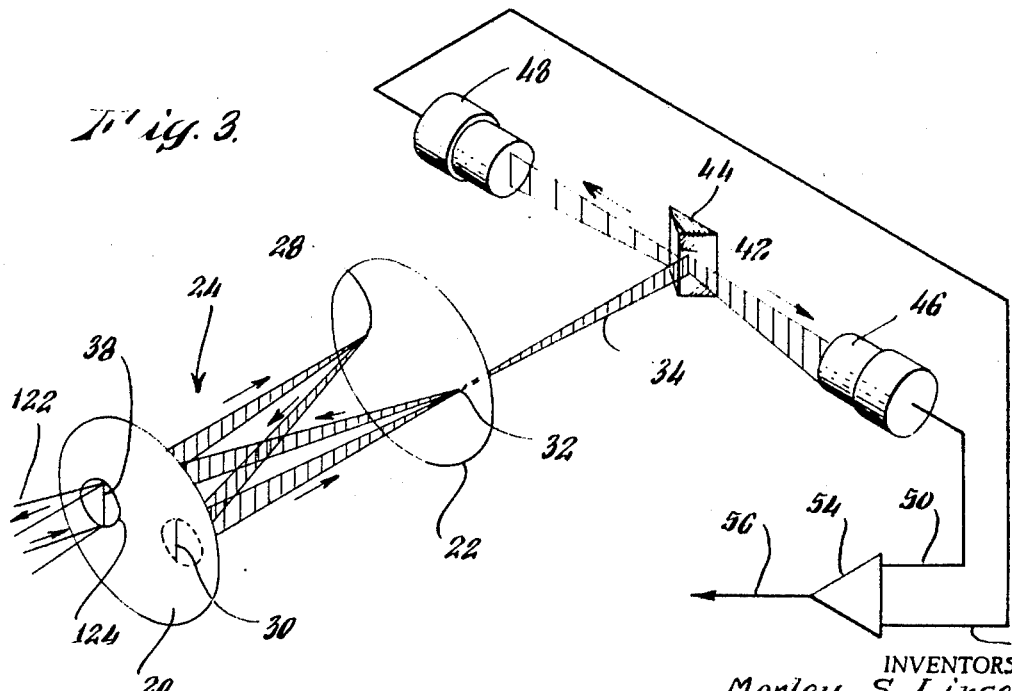
FIGURE 3 is a perspective view partially in diagrammatic form of the optical discriminator of FIGURE 2.

FIGURE 3 illustrates the situation when the frequency of the laser 58 (FIGURE 1) increases and thus the wavelength decreases. The resonant mode pattern, lines 38 and 30, move inwardly towards the axis and this causes the emergent beam 34 to move angularly to the right so that more light falls on photodetector 46 than on photodetector 48, and an appropriate signal is produced on line 56 from differential amplifier 54. As shown in FIGURE 1, this signal is fed to the pile of piezoelectric discs 116 which may be for example 7 PZT type 5 manufactured by Clevite Corporation.

Now referring to FIGURE 4, the ability of the off-axis over-illuminated resonator 24 to act as an optical circulator is illustrated in detail. The illuminating rays 125 fall on mirror 20 and are reflected in a skew path upwardly and off to the left. Thus the rays do not return upon themselves and no light is returned to the source. The rays converge to point 28, but because they impinge upon mirror 22 along a path which is not normal to the surface at point 28, they are again reflected along a skew path generally indicated by ray 126. Ray 126 again impinges upon mirror 20 at an angle differing from the normal to the surface thereof and is reflected off at a skew angle to impinge again on mirror 22 at an angle not normal to the surface thereof to be thus reflected to the starting point on mirror 20. Since the beam within the resonator 24 never strikes a mirror surface along a normal to the mirror surface, it is never reflected back on itself and the resonator 24 is completely isolated from the source of illumination. Furthermore, portions of the entrant beam impinging on the resonator 24 exist at point 28, line 30, point 32 and line 38. Thus, the over-illuminated resonator 24 forms a four port optical circulator.

FIGURE 5 illustrates the situation when the frequency of operation of the light source over-illuminating the resonator 24 decreases, the wavelength of the light thus increasing, to provide more light to photodetector 48 than photodetector 46. The circulator property of the resonator 24 is maintained in this situation as is the complete optical isolation from the source.

Figure 6:
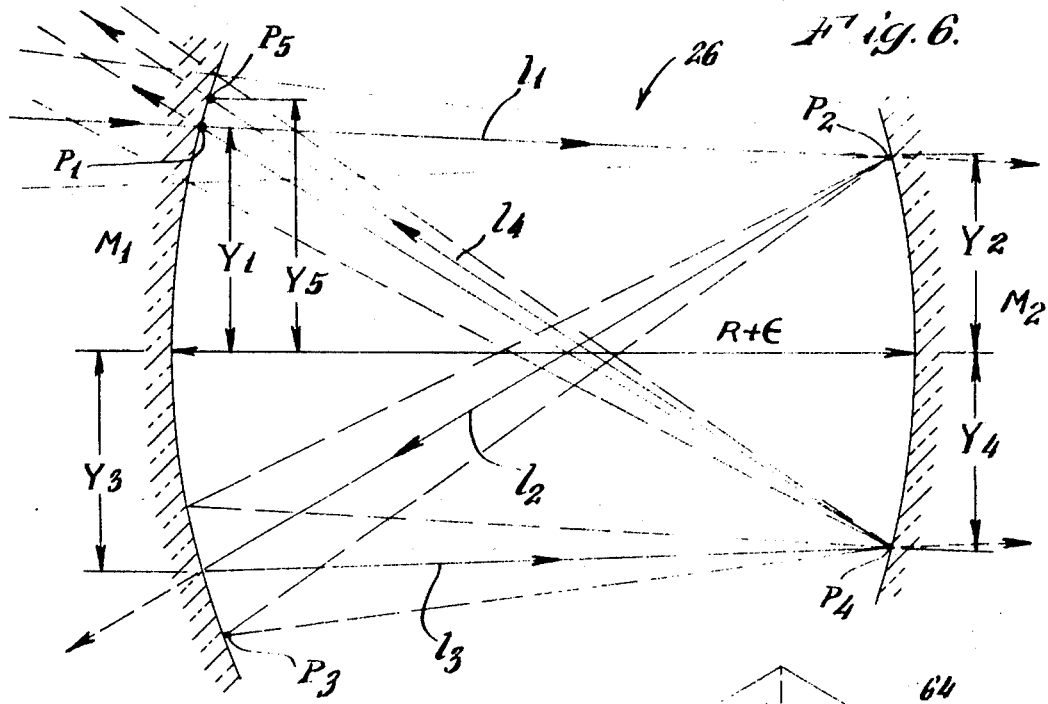
FIGURE 6 is a diagram of an optical resonator according to the invention that is an optical circulator.

Mathematically the action of the resonator 24 with reference to FIGURE 6 may be described as follows:

The interferometer comprises two identical spherical mirrors $M_1$ and $M_2$ at a near-confocal spacing of $R+\epsilon$ where $R$ is the radius of curvature of the mirrors and $\epsilon$ is a small dimension compared therewith. A laser beam is focused to a point $P_2$ on $M_2$. It is incident off-axis on $M_1$ and there it illuminates a patch of diameter $d$ (not shown). An incident ray enters the interferometer at a point $P_1$ and undergoes reflection at points $P_2$, $P_3$ and $P_4$ before returning to a point $P_5$ near $P_1$. The optical path length between $P_1$ and $P_2$ and $l_1$, and the subsequent path lengths are likewise denoted $l_2$, $l_3$, and $l_4$, respectively. An axis is formed by a line connecting the two centers of curvature. We define $Y_{1, 2 \ldots 5}$ as the normal distances of the respective points $P_{1, 2 \ldots 5}$ from this axis. The observed mode distribution requires that (a) $P_5$ coincides with $P_1$, (b) the axis is a line of symmetry and (c) the total optical path is an integral number of wavelengths $N\lambda$ of the incident beam.

Therefore, $$Y_1 = Y_5 = Y_3$$

$$Y_2 = Y_4$$

$$l_1 + l_2 = l_3 + l_4$$

and $$2(l_1 + l_2) = N\lambda \qquad (1)$$

where N is of order $4R/\lambda$ if $R \gg Y_1$, $Y_2$, and $\epsilon$.

When these relations are combined and expressed in terms of R and $\epsilon$ one obtains $$N\lambda = 2\{[3R^2 + \epsilon^2 - 2\epsilon R - 2Y_1 Y_2 + 2(\epsilon R - R^2)(\alpha^{1/2} + \beta^{1/2}) + 2\epsilon R(\alpha\beta)^{1/2}]^{1/2} + [3R^2 + \epsilon^2 - 2\epsilon R + 2Y_1 Y_2 + 2(\epsilon R - R^2)(\alpha^{1/2} + \beta^{1/2}) + 2\epsilon R(\alpha\beta)^{1/2}]^{1/2}\} \qquad (2)$$

where $\alpha = 1 - (Y_1/R)^2$ and $\beta = 1 - (Y_2/R)^2$.

The direction of the incident beam fixes the value of $Y_2$ and Equation 2 may, therefore, be differentiated with respect to the two remaining variables $\lambda$ and $Y_1$. Imposing the conditions $(Y_1/R)^2$, $(Y_2/R)^2$ and $\epsilon/R \gg 1$ and expanding the resulting expression, one obtains the approximation:

$$\Delta Y_1 / Y_1 \sim -2R^4 (Y_1^2 Y_2^2 + 2\epsilon R Y_1^2)^{-1} \Delta\lambda/\lambda \qquad (3)$$

where only lowest order terms have been retained.

The meaning of Equation 3 is that in order for the optical path to continue to be exactly resonant when the wavelength changes by an amount $\Delta\lambda$, $P_1$ and $P_3$ must move to new locations on $M_1$, since R, $\epsilon$ and $Y_2$ are constants. They are free to do so provided the mode distribution at $P_1$ continues to be within the diameter of the incident beam, i.e. if the mode is over-illuminated.

The sensitivity with which this can occur may be seen by noting that a good working ratio of R to $Y_1$ and $Y_2$ is typically of order 100 and $\epsilon$ can be made equal to zero. In this case $\Delta Y_1 / Y_1 \sim -2 \times 10^8 \Delta\lambda/\lambda$. That is, for mirror having a curvature of 10 centimeters, a frequency change of 5 parts in $10^{10}$ produce a fringe movement of 0.1 millimeter.

Referring again to FIGURE 6, we note that light is transmitted out of the interferometer at each of the four ports previously denoted by $P_2 \ldots _5$. In principle, the mode change with wavelength can be observed through all four ports, but here we consider only the behavior of the light emerging from $P_4$. This light appears to originate from $P_3$, whose location, we have seen, is a variable. But the location of $P_4$ is a constant. Hence, the beam that emerges appears to pivot about this point when the wavelength is varied. From equation 3, this angular change, which we denote by $\Delta\theta$, is given in magnitude by:

$$|\Delta\epsilon| \sim 2R^3 (Y_1 Y_2^2 + 2\epsilon R Y_1)^{-1} \Delta\lambda/\lambda \qquad (4)$$

and is of order $2 \times 10^6$ radians for the previous example. That is, a dispersive power of 18 megacycles per degree. Furthermore, this may be increased by using flatter mirrors.

In the meridional plane the approximate width of the intensity peak at $P_1$ (and at $P_3$) can be derived as follows: We know from Equation 2 that a value of $Y_1$ can be found which makes the total optical path length in the interferometer equal to an integral number of wavelengths $N\lambda$. However, an equally permissible value $Y'_2$ can be found for a length equal to $(N+1)\lambda$. The difference $$|Y_1 - Y'_1|$$

expresses the distance between intensity maxima and typically is of the order of several centimeters.

This would also be the width of single maximum if only two-beam interference took place between the mirrors. But since multiple-beam interference takes place the width will actually be on the order of this distance divided by the finesse of the interferometer. The finesse can be calculated from a formula given by Herriott, et al., supra, and is typically 150 or more for multiple-dielectric mirror coatings. Hence, the ratio $|Y_1 - Y_1|/F$ is satisfactorily small to account for the concentration of light into the observed mode pattern at $M_1$.

In the sagittal plane, the wavefront incident at $M_1$ is successively reimaged on itself by $M_2$. In effect, the mirrors function as an ordinary hemispherical resonator and produce characteristic hemispherical mode patterns in this plane.

Figure 7:
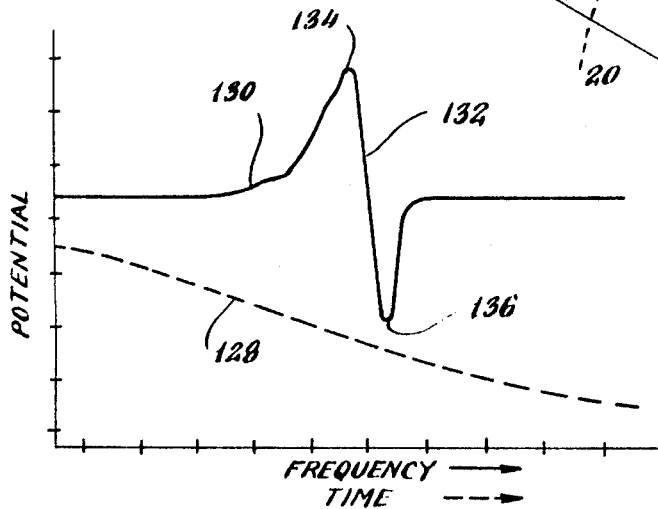
FIGURE 7 is a plot showing the open loop response of the laser frequency stabilization system shown in FIGURE 1.

Now, referring to FIGURE 7, when the transducer 60 (FIGURE 1) is driven open loop with the sawtooth voltage 128, the scale in FIGURE 7 being equal to 10 volts per division, the laser mirror 114 (FIGURE 1) is caused to move by an amount that tunes the laser over a range of $10^{-4}$ angstroms (10 megacycles per second) per applied volt. The upper trace 130 in FIGURE 7 is the output of the differential amplifier 54 (FIGURE 1). Each division of the vertical scale being equal to five volts. Measured in terms of the laser frequency changes represented by the lower trace, the slope of the steep portion 132 of the discriminator curve is approximately one volt per megacycle per second. The peak to peak linear range of the discriminator from point 134 to point 136 in FIG. 7 is approximately 18 megacycles. Note that the signal to noise ratio achieved is approximately 60 db. Because of this, by our invention we are able to control the frequency of the laser of FIGURE 1 to a line width of approximately 1500 cycles per second. A stability equal to one part in $10^{11}$ at the 6328 angstroms operating wavelength of the helium-neon laser 58. (FIGURE 1).

Again referring to FIGURE 1, if it is desired to provide frequency stabilization to the laser 58, the resonator 24 is enclosed in the environmental control box 36 and is preferably kept at a very low temperature in, for example, a helium dewar to reduce the thermal motion of the mirrors 20 and 22. Thus, by relatively simple means we have provided a frequency standard that may be relatively easily stabilized to one part in $10^{11}$.

This frequency standard, however, cannot conveniently be used as a wavelength standard in a normal laboratory because the paths through which most measurements are made include the ambient atmosphere. Changes in the atmospheric temperature, pressure, and humidity and gas content lead to wavelength differences even though the light passing therethrough is of constant frequency. According to our invention, the environment stabilization box 62 illustrated in FIGURE 10 may be used for this purpose. This box is preferably composed of a low heat content, high thermal conductivity material so that the temperature within the resonator 24 is kept as close as possible to that of the ambient atmosphere. The interior of the resonator 24 is opened to the atmosphere. However, in order to isolate the resonator 24 from acoustic atmospheric disturbances a cotton plug 64 is used which forms an acoustical filter, so that only long term changes in the ambient atmosphere affect the interior space in the resonator 24.

Now referring to FIGURE 8, a convenient way of becoming familiar with the properties of the stabilization scheme is to slave two independent lasers 68, 70 to a common passive resonator 24. The laser plasma tubes 69, 71 are mounted with their Brewster angle windows 73, 75 facing horizontally in one case (73) and vertically in the other (75). As a result, the output beams are polarized orthogonally with respect to each and can be separated after tracing identical paths through the reference interferometer. The laser beams are combined by mirror 138 and beam-splitter 140. Half of the superposed light 142 after reflection by mirror 143 is used to over-illuminate the resonator. The other half 145 after reflection by mirrors 147—147 passes through a polarized filter 83 oriented at 45° to both planes of polarization and, on detection by a photodetector 82, is used to monitor the spectrum of beats between the lasers. The interferometer mirrors 144—144 are convex-concave meniscus lenses with dielectric mirror coatings on the concave surfaces. The convex radius of curvature is chosen such that when nominally plane laser beams are incident on the interferometer, they are automatically made convergent to match the required mode geometry. On transmission from the port 146, light is spatially separated by a calcite prism 72 into its two constituent polarized beams.

Fluctuations of the angular position of each beam are measured with prisms 148, 150 photomultipliers, 152–154, 156–158 and differential amplifiers 160–162. The two resulting error signals are amplified by a pair of high voltage operational amplifiers and drive the transducers 78–80 that tune each laser. In this way both lasers are stabilized with negligible interaction in closed-loop fashion against exactly the same path length in the resonator 24. This establishes an identical mean wave length for both lasers and, therefore, a beat spectrum centered at D.C. However, one laser can be offset slightly with respect to the other by a lateral adjustment of one of the beam-dividing prisms. This allows the beat spectrum to be shifted up in frequency to where a low-frequency panoramic spectrum analyser can conveniently be used to observe the spectrum.

The lasers 68–70 operate at 6328A and comprise small direct current excited He-Ne plasma tubes 69, 71 and external mirrors 164—164, 166—166 arranged as shown. A single mode output of several hundred microvolts in a well collimated beam can be obtained using large-radius mirrors at a spacing of 15 cm.

Each laser may be tuned by changing the spacing of its mirrors, as shown in FIGURE 1, or by other known tuning means.

The reference resonator mirrors 144—144 are housed in an open invar frame 149. The concave surfaces (radius of curvature equal to 10 cm.) had dielectric mirror coatings, and, when spaced at slightly less than the confocal spacing of 10 cm., they supported the requisite mode pattern. The interferometer was adjusted to be resonant over a frequency range of about 18 mega-cycles per second with a nominally plane incident beam of 1.5 millimeters diameter. The values of $Y_1$ and $Y_2$ were 1.5 millimeters (at the center of the incident beam) and 0.5 millimeters respectively, and was estimated from Equation 3 to be about 0.1 millimeters.

Due to defraction effects, we have found that the resonant condition can only be achived with a mirror spacing less than confocal although the mathematics set out above would appear to indicate that a spacing slightly greater than confocal will work. However, this mathematics does not take into account defraction effects.

As previously stated, the system of FIGURE 8 may be used as a sensitive microphone by choosing the bandwidth of the servoloops properly. For example, if discriminator detector 74 has a bandwidth form D.C. through the audio range, and discriminator detector 76 has a bandwidth from D.C. to fifty or sixty cycles per second, the two lasers 68 and 70 will be stabilized over the latter range. However, laser 70 will be modulated by soundwaves from fifty or sixty cycles per second through the audio range and these frequencies will be detected by photodetector 82 as beats between the two beams.

Now referring to FIGURE 9, the transmitting laser 84 of an optical communication system may be frequency stabilized as shown in FIGURE 1. Known modulation means 86 may be supplied with a modulation signal on line 168 to modulate the beam 90. Upon arriving at the local receiver 88, beam 90 is treated in the same manner as the beam from the laser 70 in FIGURE 8. Thus, it is combined with the beam from local laser 92 and over-illuminates resonator 24 which is identical to the resonator described with reference to FIGURE 8. The two beams are split by the Calcite prism 72 and deviations in frequency are detected by the discriminator detectors 94 and 96, identical to the detectors 74 and 76 of FIGURE 8. However, the signals from the amplifier 160 and 162 are not used to tune the lasers but are algebracially added in differential amplifier 98 to produce a difference signal on line 100 which is used to tune laser 92 by means of known tuning means 102 which may take the form shown in FIGURE 1. In this way, laser 92 is made to operate precisely at the frequency of the arriving light beam 90. The combined beam is allowed to fall on photodetector 104 after passing through a polarizer 106 oriented at 45° to the planes of polarization of the light from each of the lasers 84 and 92. The beat signal from the photmultiplier 104 on line 106 is thus the modulation signal applied to modulator 86 on line 168 and true heterodyne detection is achieved. The bandwidth of the modulation for a vacuum path between distance laser 84 and local receiver 88 is only limited by the bandwidth of the servoloop. That is, the bandwidth is essentially the bandwidth of the amplifiers 162 and 98. If the modulation signal 168 is of wide bandwidth, it is desirable that the receiver 88 illustrated in FIGURE 9 be operated as a superheterodyne receiver. To do this one merely adjusts the system so that differential amplifier 98 provides a signal equal to the difference in the two signals supplied to it plus a constant. One way to do this is to offset one of the prisms 148 or 150 so that the mode patterns of the two beams in the resonator 24 are not precisely coincident. Another way to do this is to appropriately modify amplifier 98.

When this is done, local laser 92 will operate at a frequency displaced a precise amount from the carrier frequency of the arriving light beam 90. As will be apparent to those versed in the radio art, the signal on line 106 from the photodetector 104 will similarly be a modulated signal with a carrier frequency equal to the difference in frequency of operation between lasers 84 and 92. This may conveniently be chosen to be an intermediate frequency which can be conveninetly amplified by amplifiers having a bandwidth equal to the wide band modulation on the arriving light beam 90. Thus, according to our invention, relatively simply super-heterodyne detection is achieved.

If laser 84 is very distant and the light therefrom weak, or if an I.F. frequency drift of a few kilocycles is permissable, another super-heterodyne system may be employed. The discriminator detector 94 is eliminated, as is differential amplifier 98. The output of amplifier 162 is fed directly to tuning means 102 on line 100. Thus, the distant and local lasers 84 and 92 are independently stabilized and the I.F. frequency from photodetector 104 will drift within the residual instabilities of lasers 84 and 92. In this system, it is unnecessary to illuminate the resonator 24 with the arriving light beam 90 and this feature of the system illustrated in FIGURE 9 may be eliminated.

Apparatus for detecting beam deflection may be other than the prism-two photomultiplier system described above. Alternating apparatus may be used wherein for example a light beam deviator makes the two photomultipliers appear to interchange their positions so that any gain drift of the photomultipliers is effectively cancelled out. Such apparatus would include synchronous switching of the electrical outputs from the photomultipliers.

As will be apparent to those skilled in the art, we have provided an optical resonator which, when over-illuminated off-axis, acts as a dispersive optical circulator. The circulator properly allows the resonator to be used for monitoring a laser and yet be decoupled therefrom. The dispersive function of the resonator can be utilized to provide a simple optical discriminator. The discriminator may be employed with electrical servomechanisms for tuning a laser to precisely control the frequency or wavelength output thereof.

The electro-optical discriminator of the invention may be employed in systems for observing the stability of a pair of lasers and in heterodyne detectors of optical communications systems.

It will thus be seen that the objects set forth above among those made apparent from the preceding description are efficiently attained and such certain changes may be made in the above constructions and systems without departing from the scope of the invention, it is intended that all matter contained in the above description or shown in the accompanying drawings shall be interpreted as illustrative and not in a limiting sense.

Having described our invention, what we claim as new and desire to secure by letters patent is:

1. A dispersive optical system comprising:
   (A) an axially symmetric optical resonator producing at least one resonant mode pattern resulting from a closed optical path that changes spatially as light supplied thereto changes in wavelength and which is nowhere colinear with the axis of symmetry of said resonator; and,
   (B) optical beam forming means for over-illuminating one only of said mode patterns of said resonator.

2. The dispersive optical system defined in claim 1; and
   (C) means for detecting spatial changes in said resonant mode pattern whereby to form an optical discriminator.

3. The discriminator defined in claim 2 wherein said detecting means comprises:
   (a) beam dividing means for spatially dividing an output beam from said resonator into two beams, and
   (b) a pair of light detectors each receiving one of said beams.

4. The discriminator defined in claim 2 wherein said detecting means comprises:
   (a) a light detector for receiving a spatial portion of an output beam from said resonator.

5. The optical discriminator defined in claim 2; and
   (D) a laser supplying light to said beam forming means; and,
   (E) means for changing the frequency of operation of said laser in response to said means for detecting spatial changes in said resonant mode pattern in said resonator whereby to form a laser stabilization system.

6. The dispersive optical system defined in claim 1, wherein said resonator and said beam forming means are arranged such that the beam illuminating said resonator never strikes a surface of said resonator along a path normal to said surface whereby to form an optical circulator.

7. The dispersive optical system defined in claim 1, and:
   (C) means for providing a stable environment for said resonator.

8. The dispersive optical system defined in claim 1 wherein the interior of said resonator is open to the atmosphere.

9. The dispersive optical system defined in claim 1 wherein the interior of said resonator is open to the atmosphere through acoustical filter means.

10. The dispersive optical system defined in claim 1; and,
    (C) a tunable light source for supplying light to said optical beam forming means whereby to form an optical beam deflecting means.

11. The dispersive optical system defined in claim 1; and,
    (C) a source of extremely monochromatic light; and,
    (D) optical path length varying means within said resonator whereby to form an optical beam deflecting means.

12. A laser system comprising:
    (A) a laser;
    (B) means for changing the frequency of operation of said laser in response to an error signal;
    (C) an optical resonator producing a resonant mode pattern that changes spatially as light supplied thereto changes wavelength;
    (D) means for supplying light from said laser to said resonator to over-illuminate a resonant mode pattern thereof; and,
    (E) means responsive to spatial changes in the resonant mode pattern in said resonator to supply an error signal to said frequency changing means whereby said laser will operate at the peak frequency of said mode without dithering.

13. A laser system comprising:
    (A) a pair of lasers;
    (B) means for changing the frequency of operation of each of said lasers in response to an error signal;
    (C) an optical resonator producing a resonant mode pattern that changes spatially as light supplied thereto changes wavelength;
    (D) means for supplying orthogonally polarized light from said lasers to said resonator to over-illuminate the same; and,
    (E) a pair of means each responsive to spatial changes in a respective one of the orthogonally polarized resonant mode patterns in said resonator to produce an error signal for the respective one of said frequency changing means.

14. The laser system of claim 13 wherein the bandwidth of the frequency changing and error signal producing means connected to at least one of said lasers is below the audio range and that of those connected to at least one of the others encompasses said range.

15. An optical heterodyne receiver comprising:
    (A) a laser tunable in response to an applied signal;
    (B) an optical resonator producing a resonant mode pattern that changes spatially as light supplied thereto changes in frequency;
    (C) means for over-illuminating said resonator in a common mode with light from said laser in a first polarization and with light from a transmitter in an orthogonal polarization;
    (D) a pair of means each responsive to spatial changes in the light of a respective one polarization of said resonant mode pattern in said resonator to produce a signal;
    (E) means responsive to the signals from said pair of means to produce a difference signal;
    (F) means for applying said difference signal to said tunable laser; and
    (G) light responsive means receiving light from said tunable laser and from the transmitter.

16. The receiver defined in claim 15 wherein said means producing a difference signal produces a signal equal to the difference between the two applied signals plus a constant.

17. A resonant optical circulator comprising:
    (A) a pair of reflecting surfaces shaped and arranged to form at least one axis of symmetry intersecting them; and,
    (B) optical beam forming means for illuminating a resonant optical path between said surfaces that is nowhere colinear with said axes of symmetry, is nowhere bidirectionally colinear, and produces a mode pattern comprising spots on one of said surfaces and lines on the other of said surfaces.

18. The resonant optical circulator of claim 17 wherein said circulator takes the form of a pair of axially aligned meniscus lenses with their concave surfaces facing, at least one of said lenses serving to focus incident light from outside said circulator onto one of said spots of said mode pattern.

19. The resonant optical circulator defined in claim 17, wherein said optical beam forming means is focused on one of said surfaces.

20. The resonant optical circulator defined in claim 17, wherein said surfaces are spherical, of equal radius of curvature, and separated by a distance, slightly less than their radius of curvature.

21. The resonant optical circulator defined in claim 20 wherein said optical beam means is focused on one of said spherical surfaces.

22. An optical heterodyne receiver comprising:
(A) a laser tunable in response to an applied signal;
(B) an optical resonator producing resonant mode patterns that change spatially as light supplied thereto changes in frequency;
(C) means for over-illuminating one of said mode patterns of said resonator with light from said laser and with light from a transmitter;
(D) a pair of means each responsive to spatial changes in the light of a respective one of said lasers exiting from said resonator to produce a signal;
(E) means responsive to the signals from said pair of means to produce a difference signal;
(F) means for applying said difference signal to said tunable laser; and
(G) light responsive means receiving light from said tunable laser and from the transmitter.

23. The receiver defined in claim 15 wherein said means producing a difference signal produces a signal equal to the difference between the two applied signals plus a constant.

24. The laser system defined in claim 12; and
(F) means for combining light from said laser with modulated light from a distant laser; and,
(G) light responsive means for receiving the said combined light whereby to form an optical super-heterodyne receiver.

References Cited

UNITED STATES PATENTS

| | | | |
|---|---|---|---|
| 2,740,901 | 4/1956 | Graham | 250—230 |
| 3,055,257 | 9/1962 | Boyd | 33—94.5 |
| 3,215,840 | 11/1965 | Buhrer | 250—199 |
| 3,241,085 | 3/1966 | Marcatili | 33—94.5 |
| 3,243,722 | 3/1966 | Billings | 250—199 XR |
| 3,320,850 | 5/1967 | Oliver. | |
| 3,339,151 | 8/1967 | Smith | 250—199 XR |

OTHER REFERENCES

J. R. McDermott, Space and Aeronautics, Transmitters and Receivers for Optical Communication, pp. 98–106, June 1963, Class 250, Subclass 199.

RALPH D. BLAKESLEE, Primary Examiner

A. J. MAYER, Assistant Examiner

U.S. Cl. X.R.

88—14; 331—94.5